Patented May 8, 1934

1,958,204

UNITED STATES PATENT OFFICE 1,958,204

STABILIZATION OF PEROXIDE SOLUTIONS

Joseph S. Reichert, Niagara Falls, N. Y., assignor to E. I du Pont de Nemours & Company, Inc., Wilmington, Del., a corporation of Delaware No Drawing. Application November 2, 1931, Serial No. 572,721

25 Claims. (Cl. 23—251)

This invention relates to the stabilization of peroxide solutions and more particularly to the stabilization of hydrogen peroxide solutions.

Commercial peroxide solutions, even those of relatively high purity, are usually unstable and cannot be stored for appreciable periods of time without considerable loss in strength. Some degree of stability has been attained by keeping the solution acid over a pH range of 1-3 by the addition of sulfuric or phosphoric acids, but such stabilization has been only partially satisfactory. For instance, I have found that 30% hydrogen peroxide solutions of high purity thus acidified to a pH of 1-3 have lost as high as 1-9% of their strength during a storage period of 30 days at a temperature of about 32° C.

Various organic substances have been used to inhibit decomposition of hydrogen peroxide in aqueous solutions. While these are more or less efficient in stabilizing peroxide solutions for relatively short periods of time, they have not been entirely satisfactory in stabilizing over long periods of time, for instance six months or more. The reason for the unsatisfactory results with organic stabilizers is believed to be due to their oxidation by the peroxide which in time completely destroys the stabilizer. This oxidation also often produces a yellowish color and an undesirable odor in the solution.

It has also been proposed to stabilize solutions containing available active oxygen, such as hydrogen peroxide solutions and the like, by adding thereto or precipitating therein insoluble compounds of tin, for instance precipitated stannic acid. This method of stabilization has the disadvantage of producing a cloudy, turbid product containing considerable amounts of solid matter either in suspension or settled out, which gives the peroxide solution an undesirable appearance and renders it unsuited for a variety of uses.

Various other inorganic substances have been heretofore proposed. These have not been entirely satisfactory for stabilizing over long storage periods. A further disadvantage of previously proposed stabilizers, both organic and inorganic, is that relatively large concentrations are necessary, resulting in the deposition of foreign material in goods bleached with the stabilized solutions. In some cases, for instance the bleaching of foodstuffs, this is a serious disadvantage.

One object of this invention is to provide a means of stabilizing peroxide solution so that they may be stored over considerable periods of time without substantial loss in strength. A further object is to produce substantially homogeneous peroxide solutions which remain clear, colorless and odorless when stored over long periods of time.

I have discovered that these objects may be attained by incorporating in the peroxide solution to be stabilized a small amount of a tin compound soluble therein, and maintaining conditions such that substantially no precipitation of tin compound occurs.

In one way of carrying out the present invention, a metal stannate, preferably sodium stannate ($Na_2SnO_3$), is dissolved in a freshly prepared solution of hydrogen peroxide, the acidity of which corresponds to a pH of 3.5 or more. This point of maximum acidity is important because if the solution has a higher acidity a tin compound will precipitate, whereupon the stabilizing action is correspondingly reduced. I have further found that the stability of peroxide solutions stabilized with a soluble tin compound is greatest in a pH range of from about 4 to 5, although a high degree of stability may also be obtained at a pH as high as 6. After adding the stabilizer ingredients it may be necessary to readjust the acidity so as to maintain the solution within the necessary pH range. The acidity of the solution may be adjusted to the desired pH by adding suitable acids or alkalies, for instance sulfuric acid, or hydroxides such as sodium or potassium hydroxide.

The stannate may be added to the solution in any suitable way. I prefer to first make an aqueous solution of sodium stannate, containing for instance about 10 grams of $Na_2SnO_3$ per liter, and add suitable quantities of this solution to the peroxide solutions. The proportion of stannate added may vary over a considerable range. I have found, however, that the best stabilizing action is obtained when the amount of tin compound added is equivalent to more than 5 milligrams of tin per liter and I prefer to use an amount equivalent to from 5 to 100 milligrams of tin per liter of the peroxide solution.

I have discovered that if the sodium stannate solution is treated to effect a partial hydrolysis of the stannate so as to cause an incipient precipitation therein to a point of slight turbidity before it is added to the peroxide solution, the stabilizing action is somewhat improved. The partial hydrolysis may be effected in various ways; the solution may be allowed to stand at ordinary temperatures for a few days, it may be heated for instance to 75° or 100° C. for an hour or two, or it may be treated with carbon dioxide or a small amount of sodium-hydrogen carbonate. The slight turbidity of the stannate solution does not affect the clarity of the peroxide solution when the stannate is added in stablizing amounts as herein specified.

I have found that certain impurities which often occur in hydrogen peroxide solutions and which give rise to the formation of polyvalent positive ions, tend to cause precipitation of the soluble tin compounds used as stabilizers. Salts of aluminum and nickel are examples of substances having this effect. I have found, on the other hand, that the addition of polyvalent negative ions to the stabilized solution tends to prevent precipitation of the tin compounds, whether such precipitation is caused by the presence of polyvalent positive ions or by the presence of undue amounts of acid. Substances which thus prevent precipitation of the tin compounds and which I shall hereinafter refer to as "peptizing agents" include soluble pyro-phosphates, for instance sodium pyro-phosphate ($Na_4P_2O_7$), or disodium hydrogen pyro-phosphate ($Na_2H_2P_2O_7$), or the pyro-acid. When it is desired to use the peptizing agent it is added with the soluble tin compound in small amounts. Large amounts of pyro-phosphates tend to decrease the stabilizing action of the stannate. I prefer to add the peptizing agent in amounts equivalent to about 0.005 to 0.2 gram per liter of stabilized solution. The addition of the peptizing agent makes possible the employment of higher acidities in the solution without causing precipitation of the tin compounds. I have found, for instance, that the acidity may rise as high as a pH of 2 without precipitation of the tin compound when a pyro-phosphate is present in an amount as indicated above.

By the term "100-volume hydrogen peroxide solution" in the following examples, I mean a hydrogen peroxide solution of such concentration that if all the hydrogen peroxide contained in one liter of the solution, measured at 20° C., is decomposed into water and oxygen, 100 liters of oxygen gas, measured at 0° C. and a pressure of one atmosphere, will be obtained. Thus, 100 c. c. of 100-volume hydrogen peroxide solution will contain approximately 30 grams of hydrogen peroxide. The term "volume concentration" is likewise used to denote the concentration as a fraction or multiple of "100-volume" concentration.

Example 1

Three samples of 100-volume hydrogen peroxide were made up with the acidity of each lot adjusted to a definite pH value. Each sample was stabilized by dissolving therein a definite amount of sodium stannate. The stabilized samples were stored for 3 months at 32° C. and at the end of that time, the loss in volume concentration of each was determined, with the results shown in the table below. The stannate concentration in the stabilized solutions is expressed in terms of tin equivalents.

| Sample | pH | Stannate concentration | Loss in volume concentration |
|---|---|---|---|
| 1 | 4.5 | 5 mg./l | 0.4 |
| 2 | 4.0 | 10 mg./l | 0.1 |
| 3 | 4.5 | 15 mg./l | 0.3 |

All the samples remained clear and colorless and developed no odor.

Example 2

The acidities of samples of 100-volume hydrogen peroxide solution were adjusted to various definite pH values, ranging from 3.5 to 7.6 and an amount of sodium stannate equivalent to 50 milligrams of tin per liter was dissolved in each. Each sample was maintained at a constant temperature of 32° C., and the rate of oxygen evolution was measured. From these measurements, the losses in volume concentration equivalent to the loss over a period of 30 days were calculated. The results are given in the following table:

| Sample | pH | Loss in volume concentration in 30 days |
|---|---|---|
| 1 | 3.5 | 0.4 |
| 2 | 3.5 | 0.1 |
| 3 | 4.1 | 0.2 |
| 4 | 4.9 | 0.06 |
| 5 | 6.0 | 0.1 |
| 6 | 7.6 | 2.2 |

Example 3

Two samples of 100-volume hydrogen peroxide solution were stabilized by the addition of an amount of sodium stannate equivalent to 10 milligrams of tin per liter of solution, the acidity of each sample having been adjusted to a pH of 4.5. After the samples had been stored in pyrex containers for 10 months at 32° C., the change in volume concentration was determined, with the following results:

| Sample | Volume concentration | | Loss |
|---|---|---|---|
| | At start | At 10 months | |
| 1 | 101.9 | 101.1 | 0.8 volume |
| 2 | 102.1 | 101.2 | 0.9 volume |

Example 4

Four samples of 100-volume hydrogen peroxide solution were prepared, having varying degrees of acidity. In each was dissolved an amount of sodium stannate equivalent to 10 milligrams of tin per liter and 0.2 grams per liter of sodium pyro-phosphate ($Na_4P_2O_7$). One of the samples was stored in glass at 32° C. for 3 months and at the end of this time its volume concentration was determined. The stability of the other samples was determined by the method described in Example 2. The following results were obtained:

| Sample | pH | Storage period | Loss in volume concentration | |
|---|---|---|---|---|
| | | | At 30 days | At 3 months |
| 1 | 2.0 | None | 0.07 | |
| 2 | 3.0 | do | 0.11 | |
| 3 | 3.8 | 3 months | | 0.10 |
| 4 | 4.0 | None | 0.06 | |

There was no evidence of precipitation, all samples remaining clear, colorless and odorless.

Example 5

A solution was prepared by dissolving 11.24 grams of sodium stannate trihydrate ($Na_2SnO_3.3H_2O$) in 1 liter of water and filtering. Part of the solution was used to stabilize samples of 100-volume hydrogen peroxide having acidities of pH 3.7 and 4.5, respectively. Four other portions of the stannate solution were treated to cause incipient precipitation to the point of slight turbidity by (a) allowing to stand ("aging") for 10 days at room temperature, (b) heating at 100° C. for 30 minutes, (c) adding 0.63 gram of $NaHCO_3$ per gram of $Na_2SnO_3$ and (d) passing $CO_2$ through the solution. The four treated portions of stannate solution were used to stabilize samples of 100-volume hydrogen peroxide. The stannate concentration in each of the 6 samples of $H_2O_2$ was equivalent to 10 mg. of tin per liter. The stabilities of all the samples were determined by the method described in Example 2. The following results were obtained:

| Sample | Treatment of $Na_2SnO_3$ solution | pH of $H_2O_2$ | Loss in volume concentration in 30 days |
|---|---|---|---|
| 1 | None | 3.7 | 0.39 |
| 2 | do | 4.5 | 0.34 |
| 3 | Aged 19 days | 4.5 | 0.07 |
| 4 | Heated 30 minutes at 100° C | 4.5 | 0.06 |
| 5 | $NaHCO_3$ added | 3.7 | 0.19 |
| 6 | $CO_2$ added | 3.6 | 0.18 |

Example 6

Samples of 10-volume hydrogen peroxide having a pH of 5 were stabilized by the addition of sodium stannate equivalent to about 10 mg. of tin per liter, and stored in brown glass bottles. Another lot of a medicinal grade of 10-volume hydrogen peroxide, labeled by its manufacturer as containing ⅕ grain of acetanilide per fluid ounce, was also placed in brown glass bottles. The samples thus prepared were divided into two lots; one lot was stored in the dark at ordinary room temperature and the other in the dark at 32° C. After a period of 8 months, the strength of the stored samples was determined, with the following results:

| Sample | Stabilizer | Storage temperature | Loss in vol. strength |
|---|---|---|---|
| 1 | $Na_2SnO_3$ | Room temp | 0.0 |
| 2 | $Na_2SnO_3$ | 32° C | 0.3 |
| 3 | Acetanilide | Room temp | 0.7 |
| 4 | do | 32° C | 8.0 |

The samples stabilized with sodium stannate remained clear, colorless and odorless.

My invention is suitable for the stabilization of hydrogen peroxide solutions of all practical concentrations. In general, the effect of the stabilizer is independent of the peroxide concentration in the ordinary commercially suitable products. The stabilization is effective over long periods of time, for instance ten months or more, the amount of decomposition over such periods being very slight, as shown by the above examples. The small amount of decomposition that does occur is uniform over the entire period of storage, indicating that there is no loss of stabilizing action.

My method of stabilization may be used to advantage for preventing undue decomposition of peroxide solutions at relatively high temperatures, for instance at 90°–100° C. The stabilizing action of the soluble tin compounds at such temperatures may be utilized to increase the effectiveness of hydrogen peroxide solutions, for instance in bleaching processes where the acidity of the solution is maintained at a pH value of not more than about 6. The following example illustrates the effectiveness of my stabilizer at elevated temperatures.

Example 7

Eight samples of 1-volume hydrogen peroxide were prepared with various degrees of acidity over a pH range of 3.5–6. Three of these samples were stabilized by adding sodium stannate in amounts equivalent to 20 milligrams of tin per liter. The time required to decompose 50% of the hydrogen peroxide in each sample at 90° C. was then determined with the following results:

| pH | Time required for 50% decomposition | |
|---|---|---|
| | Stabilized | Unstabilized |
| 3.5 | | 4.5 hours |
| 4.0 | 194 days | 3.5 hours |
| 5.0 | | 0.57 hours |
| 5.4 | | 0.37 hours |
| 5.5 | 89 days | |
| 5.8 | | 0.28 hours |
| 6.0 | 49 days | |

Besides stabilizing over long periods of time, my invention has a further advantage in that the product produced thereby is clear, colorless, and homogeneous and does not develop color, turbidity or odor during the long periods of storage. A still further advantage is that the amount of stabilizer required is extremely small and does not make the stabilized solution unfit for treating foodstuffs and the like.

I claim:

1. The method of stabilizing an acid peroxide solution comprising maintaining a tin compound dissolved therein.

2. The method of stabilizing an acid hydrogen peroxide solution comprising maintaining a tin compound dissolved therein.

3. The method of stabilizing an acid hydrogen peroxide solution comprising maintaining a tin compound dissolved therein, the acidity of said solution being maintained at such degree that no precipitation of tin compound occurs.

4. The method of stabilizing an acid hydrogen peroxide solution comprising dissolving therein sodium stannate, the amount of stannate added and acidity of said solution being maintained at such degree that no precipitation of tin compound occurs.

5. The method of stabilizing hydrogen peroxide solution comprising maintaining the acidity of said solution at a pH within the range of 3.5–6 and adding thereto sodium stannate in amount insufficient to cause precipitation of tin compound therefrom.

6. The method of stabilizing hydrogen peroxide solution comprising maintaining the acidity of said solution to a pH within the range of 3.5–6 and adding thereto an amount of sodium stannate equivalent to 5–100 mg. of tin per liter of said solution.

7. The method of stabilizing hydrogen peroxide solution comprising adjusting the acidity of said solution to a pH of 4 to 5 and adding thereto an amount of sodium stannate equivalent to 5–100 mg. of tin per liter of said solution.

8. The method of stabilizing an acid peroxide solution comprising maintaining a tin compound dissolved therein and a peptizing agent capable of preventing precipitation of tin compounds.

9. The method of stabilizing a peroxide solution comprising maintaining the acidity of said solution at a pH within the range of 2-6 and maintaining dissolved therein a metal stannate and a small amount of pyro-phosphate.

10. The method of stabilizing hydrogen peroxide solution comprising maintaining the acidity of said solution at a pH of 2 to 6 and maintaining dissolved therein sodium stannate and 0.01-0.2 g. of sodium pyro-phosphate per liter of said solution.

11. The method of stabilizing hydrogen peroxide solution comprising adjusting the acidity of said solution at a pH of 2 to 6 and adding thereto an amount of sodium stannate equivalent to 5-100 mg. of tin per liter of said solution and 0.01-0.2 g. of sodium pyro-phosphate per liter of said solution and, if necessary, readjust the acidity of the solution to within said pH range.

12. In a process according to claim 2, the steps comprising dissolving the said tin compound in water, treating to cause an incipient precipitation of tin compound and adding the treated solution of tin compound in proper amount to the peroxide solution.

13. In a process according to claim 4, the steps comprising dissolving the said stannate in water, treating to cause an incipient precipitation of tin compound and adding the treated solution of tin compound in proper amount to the peroxide solution.

14. In a process according to claim 7, the steps comprising dissolving the said stannate in water, treating to cause an incipient precipitation of tin compound and adding the treated stannate solution to the hydrogen peroxide solution.

15. In the process according to claim 10, the steps comprising dissolving the said stannate in water, treating to cause an incipient precipitation of tin compound and adding the treated stannate solution in proper amount to the peroxide solution.

16. A stable and substantially homogeneous acid solution containing available oxygen and a dissolved tin compound.

17. A stable and substantially homogeneous acid solution of a peroxide containing a dissolved tin compound.

18. A stable and substantially homogeneous acid solution of hydrogen peroxide containing a dissolved tin compound.

19. A stable and substantially homogeneous solution of hydrogen peroxide containing a dissolved tin compound and having an acidity corresponding to a pH of between 3.5-6.

20. A stable and substantially homogeneous solution of hydrogen peroxide containing a dissolved metal stannate and having an acidity corresponding to a pH of between 3.5-6.

21. A stable and substantially homogeneous solution of hydrogen peroxide containing dissolved sodium stannate and having an acidity corresponding to a pH value of 4-5.

22. A stable and substantially homogeneous solution of hydrogen peroxide containing an amount of dissolved sodium stannate equivalent to 5-100 mg. of tin per liter and having an acidity corresponding to a pH value of 4-5.

23. A stable and substantially homogeneous acid solution of hydrogen peroxide containing a dissolved metal stannate and a peptizing agent capable of preventing precipitation of tin compounds.

24. A stable and substantially homogeneous solution of hydrogen peroxide containing dissolved sodium stannate and a pyro-phosphate and having an acidity corresponding to a pH of between 2-6.

25. A stable and substantially homogeneous solution of hydrogen peroxide containing an amount of dissolved sodium stannate equivalent to 5-100 mg. of tin per liter and 0.01-0.20 g. of dissolved sodium pyro-phosphate per liter and having an acidity corresponding to a pH value of between 2-6.

JOSEPH S. REICHERT.